United States Patent [19]

Morisawa

[11] Patent Number: 5,778,270
[45] Date of Patent: Jul. 7, 1998

[54] ELECTRO-DEVELOPING TYPE CAMERA USING ELECTRO-DEVELOPING RECORDING MEDIUM

[75] Inventor: Tahei Morisawa, Tokyo, Japan

[73] Assignee: Asahi Kogaku Kogyo Kabushiki Kaisha, Tokyo, Japan

[21] Appl. No.: 644,057

[22] Filed: May 10, 1996

[30] Foreign Application Priority Data

May 11, 1995 [JP] Japan .................................. 7-137256
May 11, 1995 [JP] Japan .................................. 7-137257

[51] Int. Cl.⁶ .................................................. G03B 17/48
[52] U.S. Cl. .................................... 396/429; 396/354
[58] Field of Search .......................... 396/30, 429, 430, 396/354–358

[56] References Cited

U.S. PATENT DOCUMENTS

| | | | |
|---|---|---|---|
| 4,384,770 | 5/1983 | Tokutomi et al. | 354/25 |
| 4,580,885 | 4/1986 | Takahashi | 354/62 |
| 4,651,233 | 3/1987 | Morisawa et al. | 360/35.1 |
| 4,746,947 | 5/1988 | Nakai | 354/402 |
| 4,831,452 | 5/1989 | Takanashi et al. | 358/213.14 |
| 4,949,117 | 8/1990 | Van Heyningen et al. | 354/412 |
| 5,164,751 | 11/1992 | Weyer | 354/76 |
| 5,179,478 | 1/1993 | Aoki | 360/35.1 |
| 5,389,984 | 2/1995 | Lovenheim | 354/76 |
| 5,424,156 | 6/1995 | Aoki et al. | |

FOREIGN PATENT DOCUMENTS

5-2280   1/1993   Japan .

*Primary Examiner*—Safet Metjahic
*Assistant Examiner*—John Chizmar
*Attorney, Agent, or Firm*—Greenblum & Bernstein P.L.C.

[57] ABSTRACT

An electro-developing type camera using an electro-developing recording medium comprises a photographing lens system for forming an optical image on the medium to record and develop the image therein, a finder for viewing the image obtained by the lens system, and an image reader for optically and electronically reading the developed image of the medium. The reader includes an image sensor, a light source for emitting a light beam, and an optical guide system for making the emitted light beam pass through the medium and then for guiding the same to the sensor. The camera further comprises a mirror disposed between the lens system and the medium and having a first reflecting surface and a second reflecting surface. The mirror is movable between a first position at which the image obtained by the lens system is directed to the finder by the first reflecting surface of the mirror and a second position at which the formation of the image on the medium by the lens system is allowed without being hindered by the mirror. The second reflecting surface of the mirror forms a part of the guide system during the positioning of the mirror at the first position thereof.

15 Claims, 10 Drawing Sheets

ELECTRO-DEVELOPING TYPE CAMERA USING ELECTRO-DEVELOPING RECORDING MEDIUM

BACKGROUND OF THE INVENTION

1. Field of the Invention

The present invention relates to an electro-developing type video camera using an electro-developing recording medium in which an optical image obtained through a photographing lens system is electronically and directly recorded and developed as a visible image in very little time.

2. Description of the Related Art

Such an electro-developing recording medium per se is known. For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both the mediums being combined to face each other with a small gap therebetween. A camera using the electro-developing recording medium is already proposed, and is referred to as an electro-developing type camera hereinafter.

In the electro-developing type camera, a voltage is applied between the electrostatic information recording medium and the electric charge keeping medium, and an optical image is formed on the electrostatic information recording medium by a photographing lens system, during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is recorded and developed in the electric charge keeping medium.

When the electric charge keeping medium is constituted as a memory type liquid crystal display, the developed visible image can be kept therein even if the electric field is eliminated from the electro-developing recording medium. In the memory type liquid crystal display, the developed image can be erased by heating it to a given temperature. In this case, the same electro-developing recording medium can be repeatedly used for photographing.

The electro-developing type camera using the electro-developing recording medium may be provided with an image reader comprising a solid image line sensor, such as a CCD (charge-coupled device) line sensor, for optically and electronically reading a developed image of the electro-developing recording medium, and the read image signals obtained from the CCD image sensor may be processed in various manners. For example, the read image signals may be stored in a second recording medium, such as an IC memory card, a floppy disk, a hard disk or the like. Also, the read image signals may be processed such that the developed image is reproduced by a printer or on a TV monitor on the basis of the processed image signals.

The provision of the image reader results in the camera being bulky, because the image reader further comprises a light source for emitting a light beam and an optical guiding system for making the emitted light beam pass through the electro-developing recording medium and then for guiding the same to the CCD image sensor, and also because the electro-developing recording medium must be relatively moved with respect to the image reader so that the developed image of the electro-developing recording medium can be scanned with the light beam emitted from the light source.

Accordingly, it is desirable that the image reader should be compactly arranged for the camera's bulkiness to be reduced.

SUMMARY OF THE INVENTION

Therefore, an object of the present invention is to provide an electro-developing type camera using an electro-developing recording medium, and constituted such that an image reader for optically and electronically reading an image recorded and developed on the electro-developing recording medium is compactly arranged so that a size of the camera becomes as small as possible.

In accordance with an aspect of the present invention, there is provided an electro-developing type camera using an electro-developing recording medium, comprising: photographing means for forming an optical image on the electro-developing recording medium to record and develop the optical image therein; view-finder means for viewing the optical image obtained by the photographing means; image-reader means for optically and electronically reading an image recorded and developed by the electro-developing recording medium, the image reader means including image sensor means, light source means for emitting a light beam, and optical guiding means for making the emitted light beam pass through the electro-developing recording medium and then for guiding the same to the image sensor means; and mirror means disposed between the photographing means and the electro-developing recording medium and having a first reflecting surface and a second reflecting surface, the mirror means being movable between a first position at which the optical image obtained by the photographing means is directed to the finder means by the first reflecting surface of the mirror means and a second position at which the formation of the optical image on the electro-developing recording medium by the photographing means is allowed without being hindered by the mirror means, wherein the second reflecting surface of the mirror means forms a part of the optical guiding means of the image reader means during a positioning of the mirror means at the first position thereof.

In accordance with another aspect of the present invention, the optical guiding means of the image reader means may be constituted such that the light beam emitted from the light source means is directed to the second reflecting surface of the mirror means, and is then reflected from the second reflecting surface of the mirror means toward the electro-developing recording medium so as to be made to pass therethrough.

In accordance with yet another aspect of the present invention, the optical guiding means of the image reader means may be constituted such that the light beam emitted from the light source means is made to pass through the electro-developing recording medium, and is then directed to the second reflecting surface of the mirror means.

Preferably, the image reader means further includes optical lens system means by which the light beam made to pass through the electro-developing recording medium is focussed on a light receiving surface of the image sensor means.

Also, preferably, the light source means of the image reader means is constituted as a linear light source from which the light beam is emitted as a sheet-like light beam formed of parallel light rays, and the image sensor means of the image reader means is constituted as a line image sensor having a linear light receiving surface on which the sheet-like light beam is focussed by the optical lens system means of the image reader means.

More preferably, the light source means of the image reader means includes a plurality of light-emitting diodes linearly aligned with each other, and a collimater lens system for converting light rays, emitted from the light-emitting diodes, into the parallel light rays of which the sheet-like light beam is formed.

More preferably, the image reader means further includes driving means for driving the electro-developing recording medium in a plane perpendicular to the sheet-like light beam made to pass therethrough, such that the electro-developing recording medium is scanned with the sheet-like light beam.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
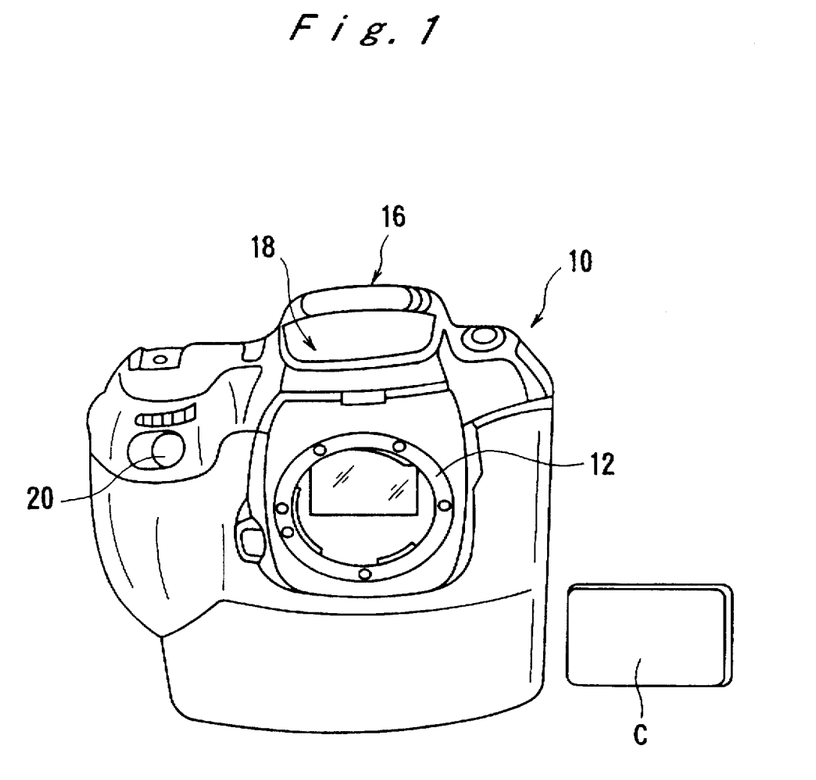
FIG. 1 is a schematic perspective view showing an appearance of an embodiment of an electro-developing type camera using an electro-developing recording medium according to the present invention.
Figure 2:
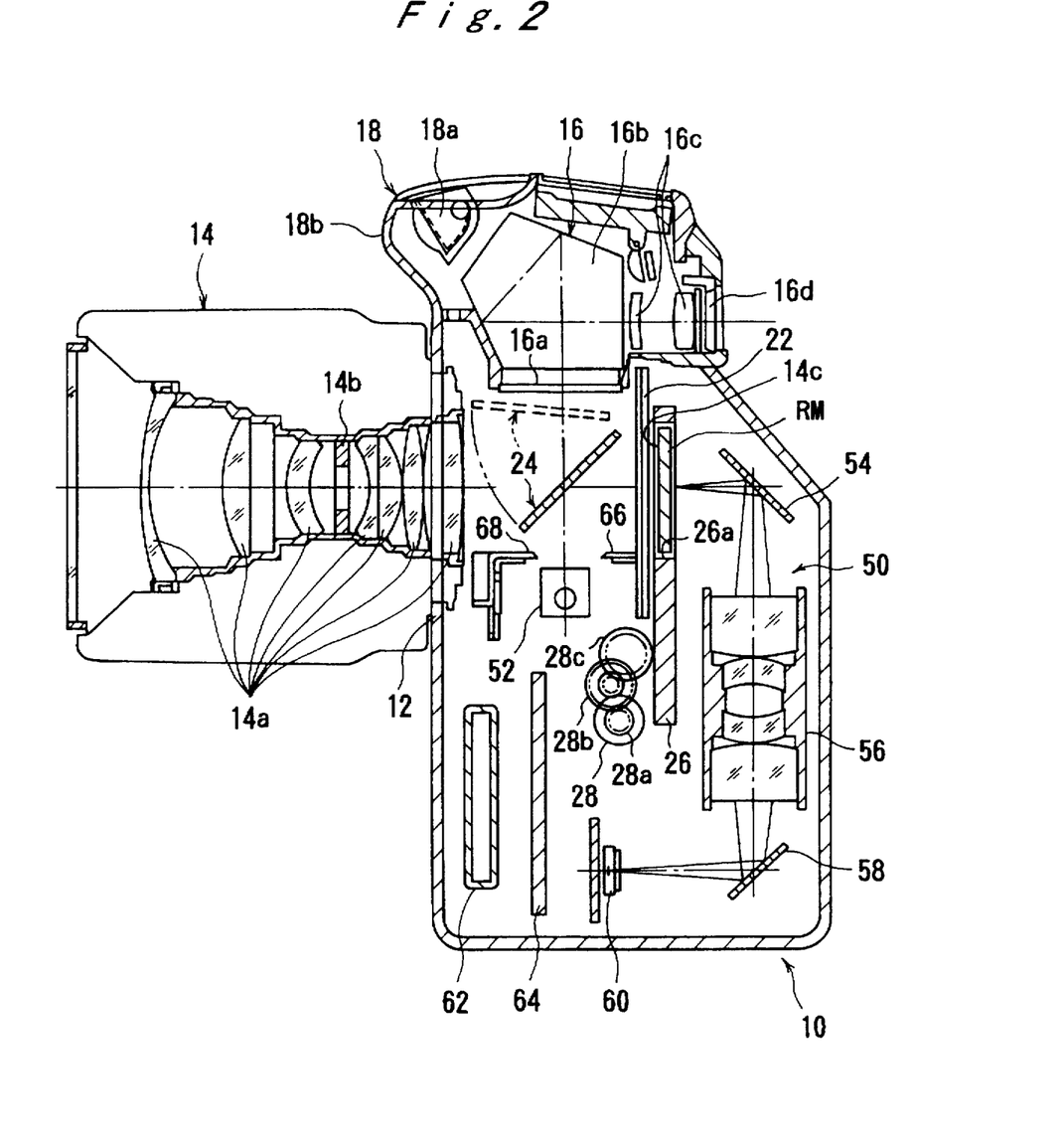
FIG. 2 is a longitudinal cross sectional view of the electro-developing type camera shown in FIG. 1.

With reference to FIGS. 1 and 2, an electro-developing type camera according to the present invention comprises a camera body 10 having a circular mount 12 provided in a central area of a front face thereof, and a photographing lens system 14 (FIG. 2) is detachably mounted on the circular mount 12. Note, in this embodiment, the photographing lens system 14 comprises an AF (autofocus) zoom lens system. The camera body 10 also has a view-finder 16 provided at an approximate center of the top portion thereof, an electronic flash 18, and a release switch 20 provided at a side of the flash 18.

As shown in FIG. 2, the photographing lens system 14 includes a plurality of lens elements 14a, and an aperture 14b incorporated therein. The view-finder 16 includes a focussing glass 16a, a pentagonal prism 16b disposed above the focussing glass 16a, lens elements 16c associated with the pentagonal prism 16b, and an eye piece 16d aligned with the lens elements 16c. The electronic flash 18 includes a flash lamp 18a, and a transparent window 18b associated with the flash lamp 18a.

The photographing lens system 14 defines an image plane 14c on which an optical image is focussed and formed thereby, and a shutter 22 is disposed adjacent to the image plane 14c at a front side thereof. A quick return mirror 24 is provided between the rear end face of the photographing optical system 14 and the shutter 22, and is movable between a down-position i.e., an inclining position shown by the solid line in FIG. 2 and an up-position, i.e., a horizontal position shown by the broken line in FIG. 2. Note, at the down-position, the quick return mirror 24 defines an angle of 45 (135) degrees with an optical axis of the photographing lens system 14.

Figure 3:
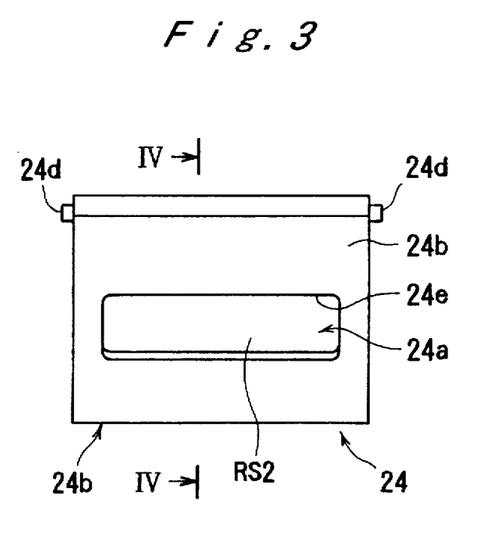
FIG. 3 is a rear view showing a quick return mirror provided in the electro-developing type camera shown in FIG. 2.
Figure 4:
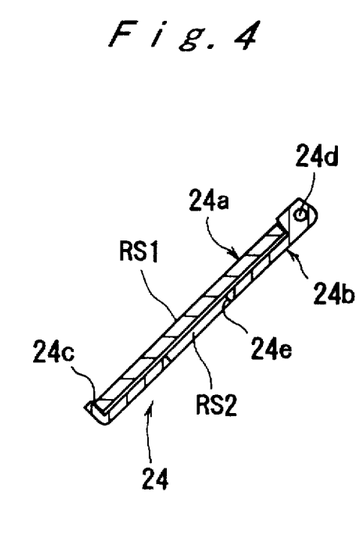
FIG. 4 is a cross sectional view taken along line IV—IV of FIG. 3.

As best shown in FIGS. 3 and 4, the quick return mirror 24 includes a plate-like mirror body 24a, and a mirror holder 24b for securely supporting the mirror body 24a. The mirror holder 24b is formed as a rectangular frame defining a recess 24c for accommodating the mirror body 24a. Also, the mirror holder 24b has a pair of stub shafts 24d, 24d protruding from upper side ends thereof, and is rotatably provided in the camera body 10 by using the stub shafts 24d, 24d, whereby the quick return mirror 24 is movable between the down-position and the up-position. The mirror body 24a has a first or front reflecting surface RS1 and a second or rear reflecting surface RS2. The mirror holder 24b has an opening 24e formed therein, and the rear reflecting surface RS2, to thereby expose the rear reflecting surface RS2.

The quick return mirror 24 is usually set to the down-position, and thus an optical image obtained from the photographing lens system 14 is directed to the focussing glass 16a of the view-finder 16 due to the front reflecting surface RS1 of the mirror body 24a, so that a photographer can observe an object to be photographed through the eye piece 16d. When a photographing operation is carried out by completely depressing the release switch 20 ON, the quick return mirror 24 is rotated upward from the down-position to the up-position, and the shutter 22 is opened. Thus, the optical image obtained from the photographing lens system 14 is directed to and focussed on the image plane 14c through the opened shutter 22.

An electro-developing recording medium RM is held by a movable frame 26, so as to be placed in the image plane 14c defined by the photographing lens system 14. Namely, the movable frame 26 has a rectangular opening 26a formed therein, and the electro-developing recording medium RM is accommodated and held in the rectangular opening 26a, such that an image-receiving surface of the electro-developing recording medium RM is included in the image plane 14c. The frame 26 is movably supported by a guide mechanism (not shown) provided in the camera body 11, and can be moved along the image plane 14c by a suitable drive motor 28 such as a stepping motor, a servo-motor or the like. In particular, the drive motor 28 has a gear 28a securely mounted on an output shaft thereof, and the gear 28a is meshed with a middle gear 28b which is then meshed with a pinion 28c engaged with a rack formed on the frame 26. Thus, the movement of the frame 26 along the image plane 14c is carried out by driving the motor 28.

Usually, the frame 26 is stopped such that the electro-developing recording medium RM is positioned at a photographing position, as shown in FIG. 2. Namely, when the electro-developing recording medium RM is at the photographing position, the optical axis defined by the photographing lens system 14 is perpendicularly extended through the center of the electro-developing recording medium RM.

Figure 5:
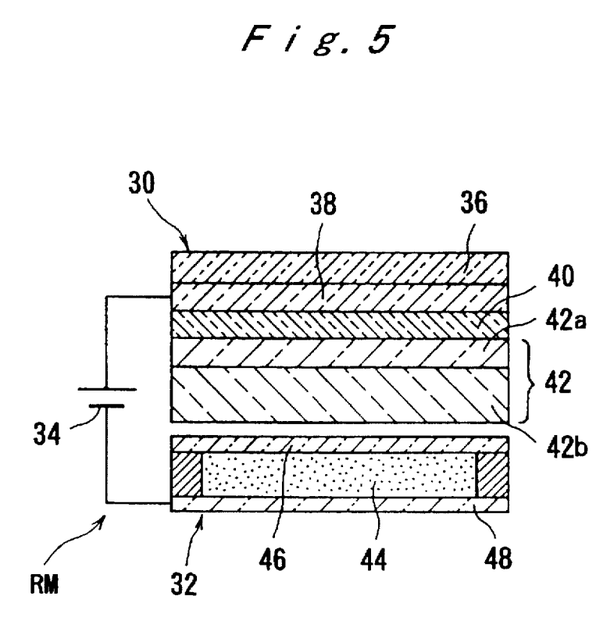
FIG. 5 is a schematic cross sectional view showing a structure of an electro-developing recording medium used in the electro-developing type camera shown in FIGS. 1 and 2.

FIG. 5 shows an example of a structure of the electro-developing recording medium RM, and this medium is identical with that disclosed in the above-mentioned Japanese Unexamined Patent Publication No. 5-2280 and U.S. Pat. No. 5,424,156, the disclosures of which are expressly incorporated herein by reference in their entirety. The electro-developing recording medium RM comprises an electrostatic information recording medium 30 and an electric charge keeping medium 32, and a voltage is applied therebetween by an electric power source 34, illustrated symbolically in FIG. 5, while the photographing operation is carried out.

The electrostatic information recording medium 30 is formed by laminating a base plate 36, an electrode layer 38, an inorganic oxide material layer 40 and a photoconducting layer 42. The photoconducting layer 42 is formed by laminating an electric charge generating layer 42a and an electric charge transferring layer 42b. The electric charge keeping medium 32 is formed by confining liquid crystal 44 between a liquid crystal supporting plate 46 and a liquid crystal electrode layer 48. The electric charge transferring layer 42b of the photoconducting layer 42 and the liquid crystal supporting plate 46 of the electric charge keeping medium 32 face each other with a small gap therebetween. Note, as is apparent from FIG. 5, the whole structure of the electro-developing recording medium RM is transparent.

When an optical image is formed on the electrostatic information recording medium 30 by the photographing optical system 14 during the application of the voltage between the electrostatic information recording medium 30 and the electric charge keeping medium 32, an electric charge distribution is produced over the electrostatic information recording medium 30 in accordance with a light intensity distribution of the optical image formed thereon, so that the intensity of an electric field acts on the liquid crystal 44 of the electric charge keeping medium 32 in accordance with the electric charge distribution. Thus, an image derived from the optical image is reproduced in the liquid crystal 44 as a visible image. Namely, as soon as the optical image is formed on the electrostatic information recording medium 30, the image is developed in the electric charge keeping medium 32.

Preferably, the electric charge keeping medium 32 is constituted as a liquid crystal display using a memory type liquid crystal. In this case, the developed visible image can be kept therein even if the electric field is eliminated from the electro-developing recording medium RM. In the memory type liquid crystal display, the developed image can be erased by heating it to a given temperature, using, for example, an electric heater element (not shown). Thus, the same electro-developing recording medium RM can be repeatedly used for photographing.

As soon as the photographing operation is completed, the quick return mirror 24 is returned from the up-position to the down-position. Thereafter, the developed image of the electro-developing recording medium RM is optically and electrically read as a series of image signals by an image reader 50 provided in the camera body 10. The image reader 50 includes a light source 52, a first total reflector 54, an optical lens system 56, a second total reflector 58, and a solid type image line sensor 60, such as a CCD (charge-coupled device) line sensor, and, according to the present invention, a part of the image reader 50 is formed by the quick return mirror 24 positioned at the down-position thereof.

The light source 52 is formed as a linear light source for emitting a sheet-like light beam, and is disposed below the quick return mirror 24 such that the emitted sheet-like beam defines an angle of 45 (135) degrees with the quick mirror 24 positioned at the down-position, as shown in FIG. 2.

Figure 6:
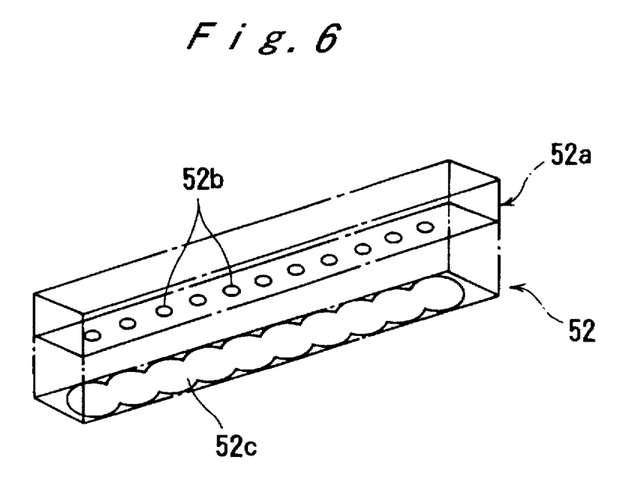
FIG. 6 is a schematic perspective view of a light source of an image reader provided in the electro-developing type camera shown in FIGS. 1 and 2.
Figure 7:
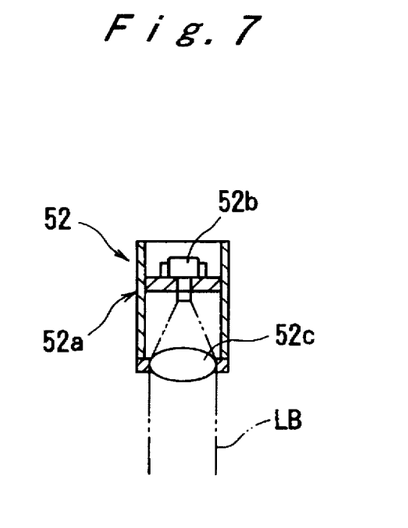
FIG. 7 is a cross sectional view of the light source shown in FIG. 6.

Preferably, the light source 52 is constituted as shown in FIGS. 6 and 7. In particular, the light source 52 includes: an elongated frame body 52a having a middle supporting plate element and a front supporting plate element; a plurality of light emitting diodes (LED) 52b aligned with each other and planted in the middle supporting plate element of the frame body 52a; and a collimater lens array 52c fitted into the front supporting plate element of the frame body 52a. As shown in FIG. 7, the light rays emitted from the light emitting diodes 52b are converted into parallel light rays by the collimater lens array 52c, and the parallel light rays are emitted as the sheet-like light beam (indicated by reference "LB") therefrom.

Note, in the light source 52, a suitable single linear light emitting body may be used in place of the plurality of light emitting diodes 52b.

Also, note, preferably, the light emitting diodes 52b of the light source 52 are selected as ones emitting blue light rays having a wavelength of approximate 450 nm, because blue light rays are susceptible to scattering when passing through the electro-developing recording medium RM.

The sheet-like light beam emitted from the light source 52 is made incident on the rear reflecting surface RS2 of the mirror body 24a through the opening 24e of the mirror holder 24b, and is then reflected toward the electro-developing recording medium RM. Note, when the reading of the developed image of the medium RM is carried out, the shutter 22 is kept open. When the sheet-like light beam passes through the electro-developing recording medium RM, it gains image information from the developed image thereof. The sheet-like light beam carrying the image information is made incident on the first total reflector 54, and is then reflected toward the optical lens system 56.

The optical lens system 56 has a magnification of one, and is constituted as a relay lens system. In particular, the optical lens system 56 has a front focal distance and a back focal distance, and these focal distances are equal to each other. The optical lens system 56 is arranged such that the developed image of the electro-developing recording medium RM is included in the front focal plane of the optical lens system 56, and the CCD line sensor 60 is arranged such that a linear light receiving surface thereof is included in the back focal plane of the optical lens system 56. Thus, the sheet-like light beam carrying the image information and passing through the optical lens system 56 is focussed on the linear light receiving surface of the CCD line sensor 60, which may comprise a one-dimensional CCD sensor having, for example, 4,096 pixels.

As is well known, the CCD line sensor 60 serves as a photoelectric-conversion device for an optical image focussed thereon into electric pixel signals, and these signals are suitably processed, and are stored as image data in a second recording medium, such as an IC memory card, a floppy disk, a hard disk or the like. In this embodiment, IC memory card C (FIG. 1) is used as the second recording medium, and is inserted into an IC card holder 62 (FIG. 2) through a slot (not visible in FIG. 1) formed in the camera body 10. When the IC memory card C is inserted into the IC card holder 62, the IC memory card C is connected to a connector provided therein.

Note, in FIG. 2, reference 64 indicates a control circuit board for controlling various operations of the camera, and reference 66 and 68 each indicates one of the inner frame elements provided in the camera body 10 for the shutter 22, the drive motor 28, the light source 42, etc.

Figure 8:
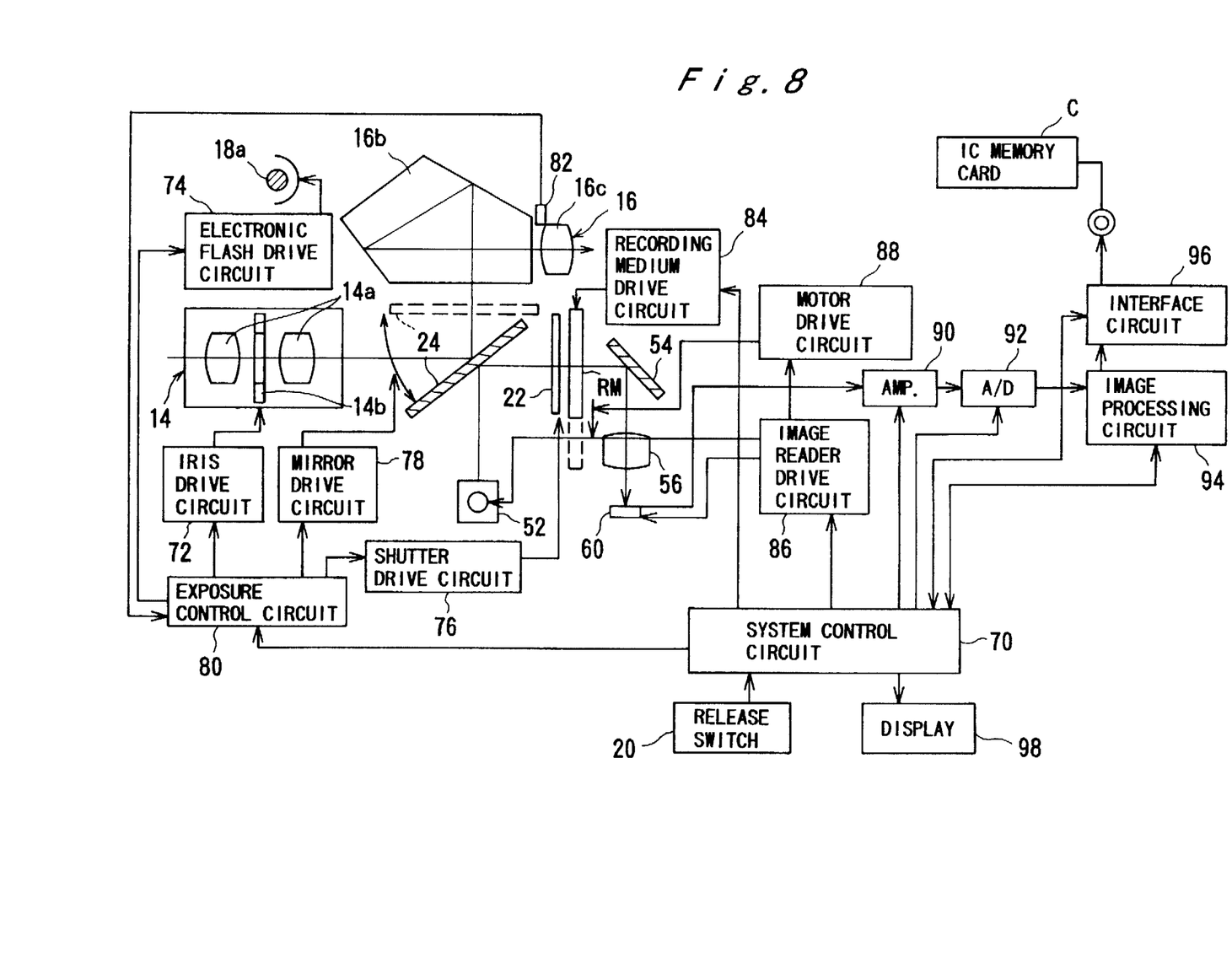
FIG. 8 is a block diagram of the electro-developing type camera shown in FIGS. 1 and 2.

FIG. 8 shows a block diagram of the electro-developing type camera as mentioned above, in which a system control circuit 70 including a micro-computer or micro-processor is provided on the control circuit board 64 to control the camera as a whole.

The aperture 14b, the flash lamp 18a, the shutter 22 and the quick return mirror 24 are driven by an iris drive circuit 72, an electronic flash drive circuit 74, a shutter drive circuit 76, and a mirror drive circuit 78, respectively. These drive circuits 72, 74, 76, and 78 are controlled by an exposure control circuit 80 which is provided with a photometry sensor 82, and which is operated in accordance with command signals outputted by the system control circuit 70. Note, the drive circuits 72, 74, 76, and 78 are provided on the control circuit board 64 (FIG. 2).

The release switch 20 is connected to the system control circuit 70, and performs two functions. In particular, when the release switch 20 is partly depressed, a command signal for executing an autofocussing operation is inputted to the system control circuit 70, whereby the photographing lens system or AF zoom lens system 14 is operated on the basis of an output signal of the photometry sensor 82. At the same time, an opening degree of the aperture 14b is adjusted by the iris drive circuit 24 under the control of the exposure control circuit 80, based on the output signal of the photometry sensor 82. Also, the flash lamp 18a of the electronic flash 18 is electrically energized under the control of the exposure control circuit 80, if necessary. Then, when the release switch 20 is completely depressed, a command signal for executing a photographing operation is inputted to the system control circuit 70.

Usually, the quick return mirror 24 is kept at the down-position, and the shutter 22 is closed. As already mentioned, when the quick return mirror 24 is at the down-position, the optical image obtained from the photographing lens system 14 is directed to the view-finder 16. When the photographing operation is carried out, i.e., when the release switch 20 is completely depressed, the quick return mirror 24 is moved from the down-position to the up-position by the mirror drive circuit 78, and the shutter 22 is opened over a given period of time by the shutter drive circuit 76 under control of the exposure control circuit 80, whereby the optical image obtained by the photographing lens system 14 is directed to the electro-developing recording medium RM.

During the photographing operation, a voltage is applied to the electro-developing recording medium RM under control of a recording medium drive circuit 84 provided on the control circuit board 64 (FIG. 2). Note, the electric power source 34, illustrated symbolically in FIG. 5, is included in the recording medium drive circuit 84. By exposing the electro-developing recording medium RM while applying the voltage, the optical image formed on the electro-developing recording medium RM obtained from the photographing optical system 14 is recorded and developed as a visible image therein. Note, the recording medium drive circuit 84 is operated in accordance with a command signal outputted by the system control circuit 70.

After the photographing operation is ended, the quick return mirror 24 is returned from the up-position to the down-position. On the other hand, although the shutter 22 is once closed after the photographing operation, it is again opened soon thereafter to thereby enable a reading operation for optically and electronically reading the developed image of the electro-developing recording medium RM to be executed. The reading operation is executed by the image reader 50 which is operated by an image reader drive circuit 86 and a motor drive circuit 88 provided on the control circuit board 64 (FIG. 2). The image reader drive circuit 86 includes an electric power source circuit for energizing the light emitting diodes 52b of the light source 52, and a line sensor drive circuit for driving the CCD line sensor 60, and the motor drive circuit 88 outputs drive pulses to the drive motor 28. The image reader drive circuit 86 and the motor drive circuit 88 are operated in accordance with command signals outputted from the system control circuit 70.

Figure 9:
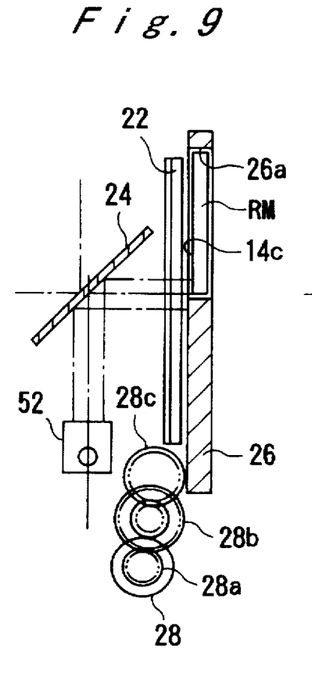
FIG. 9 is an enlarged view showing a part of the electro-developing type camera shown in FIG. 2 and illustrating a movable frame for the electro-developing recording medium at a reading-start position.

In particular, first, the drive motor 28 is driven by the motor drive circuit 88 such that the frame 26 is moved upward from the usual position shown in FIG. 2 to a reading-start position as shown in FIG. 9, and thus, the lower edge of the electro-developing recording medium RM bounds on the optical axis of the photographing lens system 14. Then, the light source 52 is energized by the electric power source circuit included in the image reader drive circuit 86, so that a sheet-like light beam is emitted therefrom, and the drive motor 28 is reversely driven by the motor drive circuit 88 such that the frame 26 is moved downward from the reading-start position to a reading-end position, as shown in FIG. 10, at which the upper edge of the electro-developing recording medium RM bounds on the optical axis of the photographing lens system 14.

The reverse movement of the frame 26 from the reading-start position (FIG. 9) to the reading-end position (FIG. 10) is intermittently carried out step by step, and thus, the electro-developing recording medium RM is scanned with the sheet-like light beam emitted from the light source 52 and reflected by the rear reflecting surface RS2 of the quick return mirror 24. At each of the scanning steps, a series of image signals are read from the CCD line sensor 60 by driving the line sensor drive circuit included in the image reader drive circuit 86.

The series of image signals read from the CCD line sensor 60 are successively amplified by an amplifier 90, and are then converted to digital image signals by an analog-digital (A/D) converter 92. The digital image signals are subjected to a shading correction, a gamma correction and so on by an image processing circuit 94, and the processed digital image signals are then fed to an interface circuit 96 in which the digital image signals are further subjected to a given processing such as a format-conversion processing and so on. Thus, the further processed digital image signals are recorded in the IC memory card C received in the holder 62 (FIG. 2). Note, the amplifier 90, the A/D converter 92, the image processing circuit 94, and the interface circuit 96 are provided on the control circuit board 64, and are operated by the system control circuit 70.

After the reading operation is completed, the image reader drive circuit 86 including the electric power circuit for the light source 52 and the line sensor drive circuit for the CCD line sensor 60 is deenergized, and the light source 52 is turned OFF, and the driving of the CCD line sensor 60 is stopped. Then, the drive motor 28 is again driven by the motor drive circuit 88 such that the frame 26 is returned from the reading-end position (FIG. 10) to the usual position, as shown in FIG. 11, at which the electro-developing recording medium RM is positioned at the photographing position. Thereafter, the motor drive circuit 88 is deenergized.

In FIG. 8, reference 98 indicates a display device which may be constituted as an LCD (liquid crystal display) panel, and which is provided on a rear surface of the camera body 10 at a suitable location thereof. The display device 98 is connected to the system control circuit 70 to display various setting conditions of the camera.

With the arrangement of the camera as mentioned above, the mirror body 24a of the quick return mirror 24 is utilized as a part of the image reader 50, and thus, it is possible to compactly arrange and constitute the image reader 50, which contributes toward reducing the size of the camera.

Figure 12:
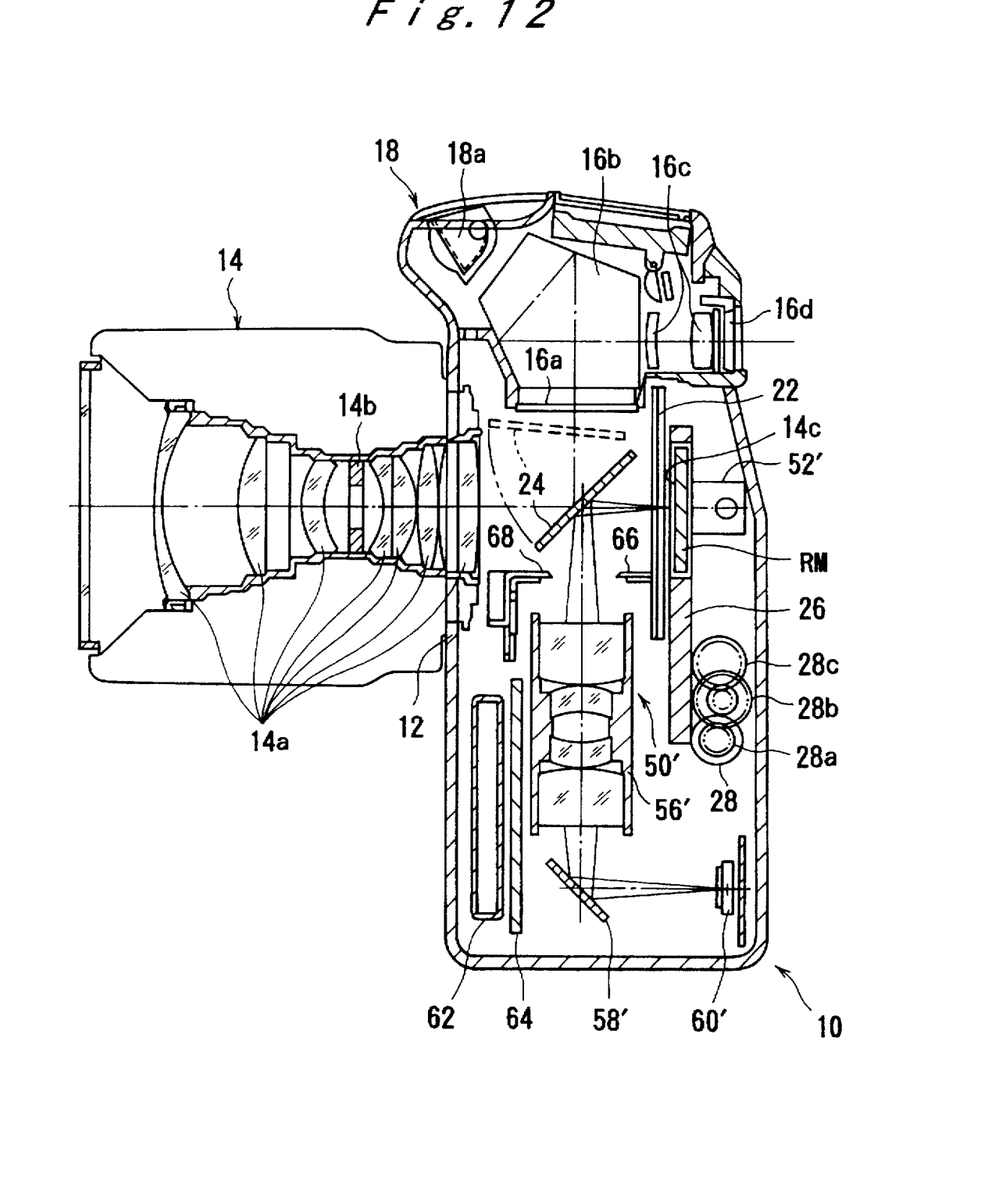
FIG. 12 is a longitudinal cross section similar to FIG. 2, showing a modification of the electro-developing type camera shown therein.
Figure 13:
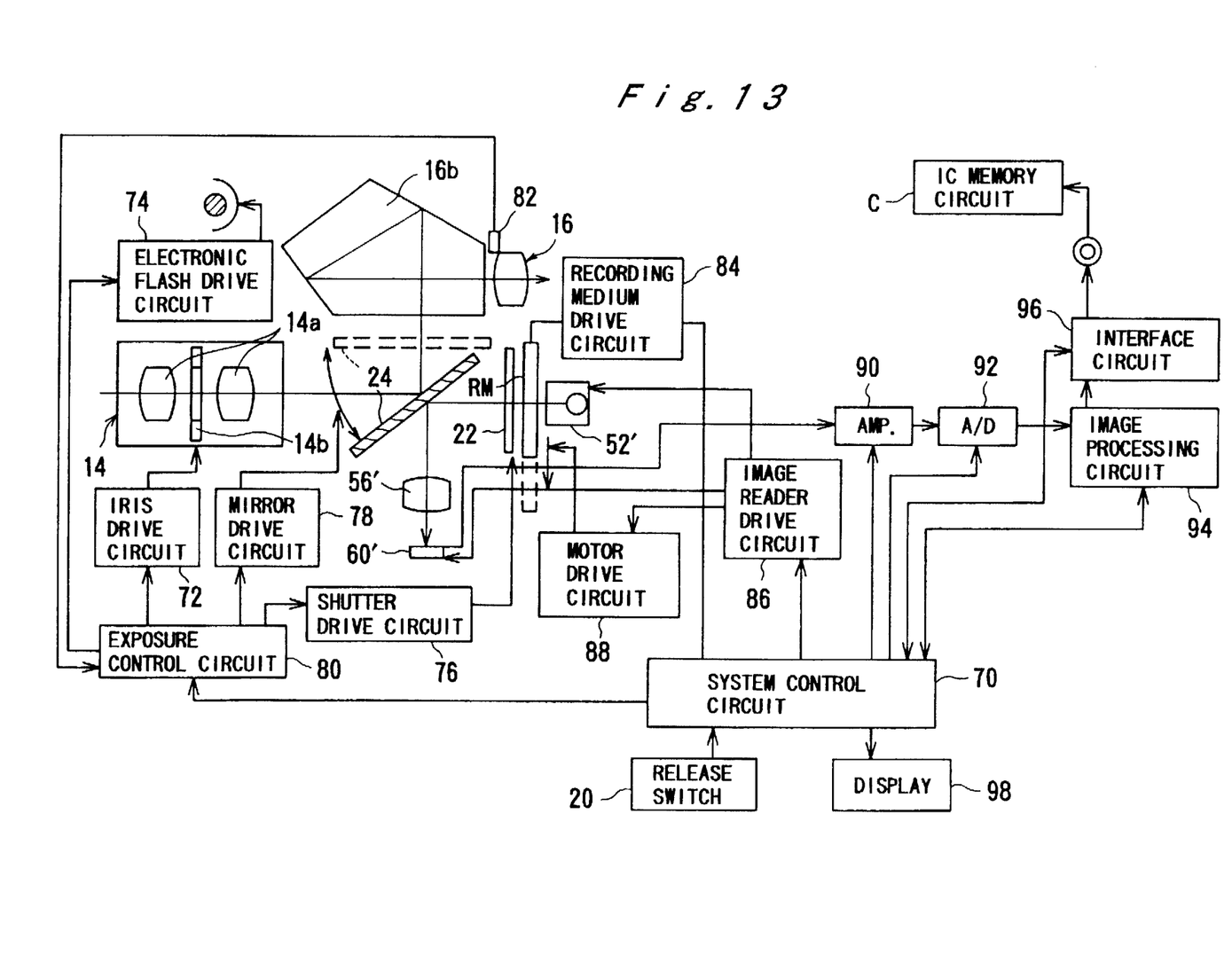
FIG. 13 is a block diagram arranged in accordance with the electro-developing type camera shown in FIGS. 1 and 2.

FIGS. 12 and 13, similar to FIGS. 2 and 8, show a modification of the above-mentioned embodiment of the electro-developing type camera according to the present invention. In these drawings, the same references as in FIGS. 2 and 8 represent the same elements.

The modified camera is identical with the camera shown in FIGS. 2 to 8 except that the arrangement of an image reader 50' is different from that of the image reader 50. In the modified embodiment, the image reader 50' includes a light source 52', an optical lens system 56', a total reflector 58', and a a CCD line sensor 60', and a part of the image reader 50' is formed by the quick return mirror 24 positioned at the down-position thereof.

As shown in FIG. 12, the light source 52' is provided at the rear side of the electro-developing recording medium RM, and is aligned with the photographing lens system 14 along the optical axis thereof. Note, the light source 52' is constituted in the same manner as the light source 52, as shown in FIGS. 6 and 7. The light source 52' emits a sheet-like light beam which is then made to pass through the electro-developing recording medium RM. The sheet-like light beam passing through the electro-developing recording medium RM is made incident on the rear reflecting surface RS2 of the mirror body 24a through the opening 24e of the mirror holder 24b, and is then reflected toward the optical lens system 56' which is constituted in the same manner as the optical lens system 56. Then, the sheet-like light beam is focussed by the optical lens system 56' on the linear light receiving surface of the CCD line sensor 60' which is constituted in the same manner as the CCD line sensor 60.

Although the block diagram shown in FIG. 13 is arranged in accordance with the modified camera shown in FIG. 12, each of the blocks shown in FIG. 13 is identical with the corresponding one shown in FIG. 8.

Figure 10:
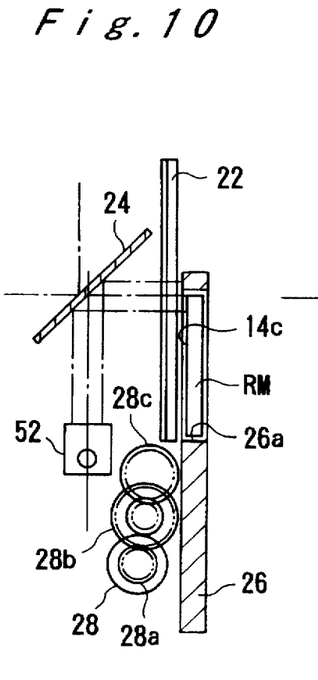
FIG. 10 is an enlarged view similar to FIG. 9, showing the movable frame for the electro-developing recording medium at a reading-end position.
Figure 11:
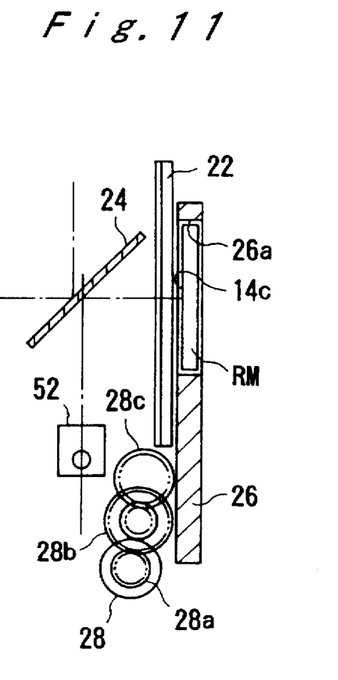
FIG. 11 is an enlarged view similar to FIG. 9, showing the movable frame for the electro-developing recording medium at a usual position.
Figure 14:
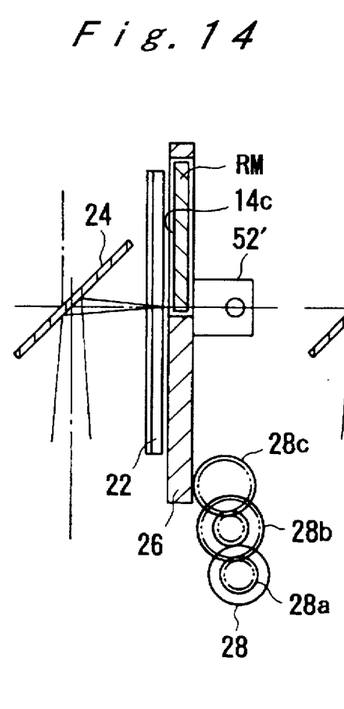
FIG. 14 is an enlarged view showing a part of the electro-developing type camera shown in FIG. 12 and illustrating a movable frame for the electro-developing recording medium at a reading-start position.
Figures 15, 16:
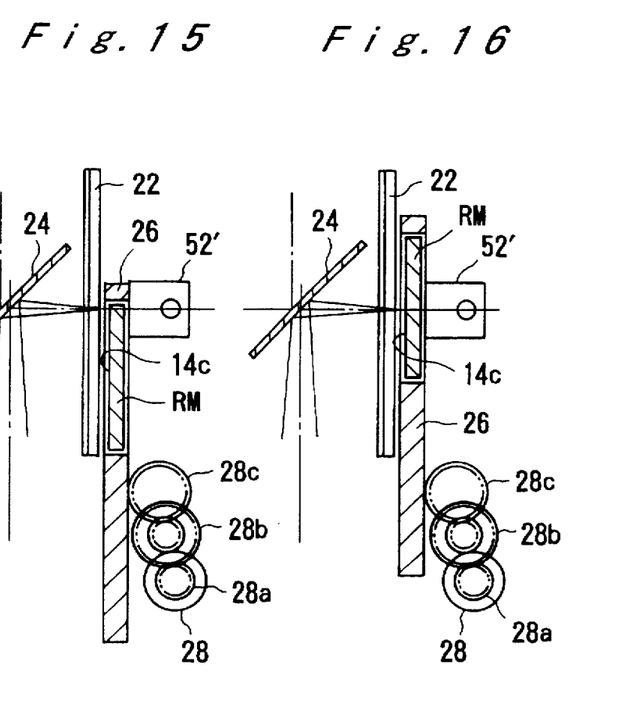
FIG. 15 is an enlarged view similar to FIG. 14, showing the movable frame for the electro-developing recording medium at a reading-end position.
FIG. 16 is an enlarged view similar to FIG. 14, showing the movable frame for the electro-developing recording medium at a usual position.

FIGS. 14, 15, and 16 correspond to FIGS. 9, 10, and 11, respectively. Namely, FIG. 14 shows the frame 26 moved upward from the usual position shown in FIG. 12 to a reading-start position by driving the drive motor 28 with the motor drive circuit 88; FIG. 15 shows the frame 26 intermittently moved step by step from the reading-start position to a reading-end position by reversely driving the drive motor 28 with the motor drive circuit 88; and FIG. 16 shows the frame 26 returned from the reading-end position to the usual position.

In the embodiments as mentioned above, the front reflecting surface RS1 of the mirror body 24a of the quick return mirror 24 may be obtained as a total reflector by forming a thin aluminum or silver film layer thereover using a well-known vacuum metalizing process. On the other hand, preferably, the rear reflecting surface RS2 of the mirror body 24a is obtained as a lamination layer film including a thin aluminum or silver layer and a suitable dielectric layer, such that a light beam component susceptible to scattering can be reflected therefrom as much as possible.

Finally, it will be understood by those skilled in the art that the foregoing description is of preferred embodiments of the disclosed electro-developing type camera, and that various changes and modifications may be made to the present invention without departing from the spirit and scope thereof.

The present disclosure relates to subject matter contained in Japanese Patent Applications No. 7-137256 (filed on May 11, 1995) and No. 7-137257 (filed on May 11, 1995), which are expressly incorporated herein, by reference, in their entirety.

We claim:

1. An electro-developing type camera using an electro-developing recording medium, comprising:

photographing means for forming an optical image on said electro-developing recording medium to record and develop said optical image therein;

view-finder means for viewing said optical image obtained by said photographing means;

image-reader means for optically and electronically reading an image recorded and developed by said electro-developing recording medium, said image reader means comprising means for sensing an image, light source means for emitting a light beam, and optical guiding means for making said emitted light beam pass through said electro-developing recording medium and for guiding said emitted light beam to said image sensing means; and mirror means disposed between said photographing means and said electro-developing recording medium and having a first reflecting surface and a second reflecting surface, said mirror means being movable between a first position at which said optical image obtained by said photographing means is directed to said finder means by said first reflecting surface of said mirror means and a second position at which a formation of said optical image on said electro-developing recording medium by said photographing means is allowed without being hindered by said mirror means, wherein said second reflecting surface of said mirror means forms a part of said optical guiding means of said image reader means during a positioning of said mirror means at said first position thereof.

2. An electro-developing type camera as set forth in claim 1, wherein said image reader means further includes optical lens system means by which said light beam made to pass through the electro-developing recording medium is focussed on a light receiving surface of said image sensor means.

3. An electro-developing type camera as set forth in claim 2, wherein said light source means of said image reader means comprises a linear light source from which said light beam is emitted as a sheet-like light beam formed of parallel light rays, said image sensing means of said image reader means comprising a line image sensor having a linear light receiving surface on which said sheet-like light beam is focussed by said optical lens system means of said image reader means.

4. An electro-developing type camera as set forth in claim 3, wherein said light source means of said image reader means includes a plurality of light-emitting diodes linearly aligned with each other, and a collimater lens system for converting light rays, emitted from said light-emitting diodes, into said parallel light rays of which said sheet-like light beam is formed.

5. An electro-developing type camera as set forth in claim 3, wherein said image reader means further includes driving means for driving said electro-developing recording medium in a plane perpendicular to said sheet-like light beam made to pass therethrough, such that said electro-developing recording medium is scanned with said sheet-like light beam.

6. An electro-developing type camera as set forth in claim 1, wherein said optical guiding means of said image reader means is constituted such that said light beam emitted from said light source means is directed to said second reflecting surface of said mirror means, and is then reflected from said second reflecting surface of said mirror means toward said electro-developing recording medium so as to be made to pass therethrough.

7. An electro-developing type camera as set forth in claim 6, wherein said image reader means further includes optical lens system means by which said light beam made to pass through said electro-developing recording medium is focussed on a light receiving surface of said image sensor means.

8. An electro-developing type camera as set forth in claim 7, wherein said light source means of said image reader means comprises a linear light source from which said light beam is emitted as a sheet-like light beam formed of parallel light rays, said image sensing means of said image reader means comprising a line image sensor having a linear light receiving surface on which said sheet-like light beam is focussed by said optical lens system means of said image reader means.

9. An electro-developing type camera as set forth in claim 8, wherein said light source means of said image reader means includes a plurality of light-emitting diodes linearly aligned with each other, and a collimater lens system for converting light rays, emitted from said light-emitting diodes, into parallel light rays of which sheet-like light beam is formed.

10. An electro-developing type camera as set forth in claim 8, wherein said image reader means further comprises driving means for driving said electro-developing recording medium in a plane perpendicular to said sheet-like light beam made to pass therethrough, such that said electro-developing recording medium is scanned with said sheet-like light beam.

11. An electro-developing type camera as set forth in claim 1, wherein said optical guiding means of said image reader means is constituted such that said light beam emitted from said light source means is made to pass through said electro-developing recording medium, and is then directed to said second reflecting surface of said mirror means.

12. An electro-developing type camera as set forth in claim 11, wherein said image reader means further includes optical lens system means by which said light beam reflected from said second reflecting surface of said mirror means is focussed on a light receiving surface of said image sensor means.

13. An electro-developing type camera as set forth in claim 12, wherein said light source means of said image reader means comprises a linear light source from which said light beam is emitted as a sheet-like light beam formed of parallel light rays, said image sensing means of said image reader means comprising a line image sensor having a linear light receiving surface on which said sheet-like light beam is focussed by said optical lens system means of said image reader means.

14. An electro-developing type camera as set forth in claim 13, wherein said light source means of said image reader means includes a plurality of light-emitting diodes linearly aligned with each other, and a collimater lens system for converting light rays, emitted from said light-emitting diodes, into parallel light rays of which said sheet-like light beam is formed.

15. An electro-developing type camera as set forth in claim 13, wherein said image reader means further comprises driving means for driving said electro-developing recording medium in a plane perpendicular to said sheet-like light beam made to pass therethrough, such that said electro-developing recording medium is scanned with said sheet-like light beam.

* * * * *

UNITED STATES PATENT AND TRADEMARK OFFICE
CERTIFICATE OF CORRECTION

PATENT NO.   : 5,778,270
DATED        : July 7, 1998
INVENTOR(S)  : Tahei MORISAWA It is certified that error appears in the above-identified patent and that said Letters Patent is hereby corrected as shown below:

At column 12, line 3 (claim 9, line 6) of the printed patent, after "into" please insert ---said---.

At column 12, line 3 (claim 9, line 6) of the printed patent, after "which" please insert ---said---.

At column 12, line 39 (claim 14, line 6) of the printed patent, after "into" please insert ---said---.

Signed and Sealed this

Thirtieth Day of November, 1999

Attest:

Q. TODD DICKINSON

Attesting Officer

Acting Commissioner of Patents and Trademarks